United States Patent
Roy

(10) Patent No.: US 6,549,782 B2
(45) Date of Patent: *Apr. 15, 2003

(54) RADIO COMMUNICATIONS SYSTEMS

(75) Inventor: Debasish Dev Roy, Boynton Beach, FL (US)

(73) Assignee: Siemens Information and Communication Networks, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/282,480

(22) Filed: Mar. 31, 1999

(65) Prior Publication Data

US 2002/0107024 A1 Aug. 8, 2002

(51) Int. Cl.⁷ .................................................. H04Q 7/20
(52) U.S. Cl. ........................ 455/450; 455/452; 455/446; 455/447
(58) Field of Search ................................. 455/450, 446, 455/447, 62, 226.2, 226.3, 561, 422, 575, 451, 509, 452, 453

(56) References Cited

U.S. PATENT DOCUMENTS

| | | | |
|---|---|---|---|
| 3,764,915 A | 10/1973 | Cox et al. ...................... 325/53 |
| 5,203,008 A | 4/1993 | Yasuda et al. ............. 455/33.1 |
| 5,353,332 A | * 10/1994 | Raith et al. .................... 379/59 |
| 5,471,671 A | * 11/1995 | Wang et al. ................. 375/224 |
| 5,649,292 A | * 7/1997 | Doner ......................... 455/447 |
| 6,047,186 A | * 4/2000 | Yu et al. ...................... 455/446 |
| 6,154,654 A | * 11/2000 | Mao ............................ 455/446 |
| 6,154,655 A | * 11/2000 | Borst et al. .................. 455/451 |
| 6,192,244 B1 | * 2/2001 | Abbadessa ................... 455/436 |

FOREIGN PATENT DOCUMENTS

| | | |
|---|---|---|
| DE | 43 02 228 A1 | 1/1993 |
| DE | 196 25 856 A1 | 6/1996 |
| EP | 0 817 521 A2 | 6/1997 |
| EP | 0 898 437 A2 | 8/1998 |
| WO | WO99/04589 | 7/1998 |

OTHER PUBLICATIONS

Brendan C. Jones, "Cochannel and Adjacent Channel Reuse Ratio Distribution in Dynamic Channel Assignment Microcellular Systems," Digital Signal Processing, pp. 338–347 Nov. 26, 1996.
International Search Report.

* cited by examiner

Primary Examiner—Nay Maung
Assistant Examiner—Lewis G. West

(57) ABSTRACT

A system and method for efficiently assigning a plurality of channels among a plurality of nodes in a radio communications system. For each node in the system, a buffer zone is established. The members of a particular node's buffer zone are that subset of the plurality of nodes in the system that are prohibited from using a channel simultaneously with the particular node. When a particular node is in need of a channel assignment, the system will assign a channel to the particular node from a subset of channels that excludes channels assigned to nodes within the particular channel's buffer zone. A co-channel zone is for each particular node is also established which includes a subset of the plurality of nodes that is near the particular node, but excludes nodes outside the particular node's buffer zone.

42 Claims, 7 Drawing Sheets

Table A
Buffer Zones

| Particular Base Station | Base Stations in Zone |
|---|---|
| 10 | 10*, 46, 52 |
| 40 | 10, 40*, 42, 60 |
| 42 | 10, 40, 42* |
| 44 | 44*, 46 |
| 46 | • |
| 48 | • |
| 52 | • |
| 56 | • |

Table B
Channel Assignment Table

| Channel | Base Stations Using Channel |
|---|---|
| • | |
| • | |
| • | |
| 2 | 42 |
| 3 | 46 |
| 4 | |
| 5 | 10, 44 |
| 6 | 42 |
| • | |
| • | |

Table C
Alternate Channel Assignment Table

| Base Station | Channels in Use |
|---|---|
| 10 | 000, 5, 000 |
| 40 | 000 |
| 42 | 000, 2, 6, 000 |
| 44 | 000, 5, 000 |
| 46 | 000, 3, 000 |
| • | • |

FIG. 4

RADIO COMMUNICATIONS SYSTEMS

BACKGROUND OF THE INVENTION

This invention relates generally to radio communications systems and more particularly to radio communications systems having multiple nodes and multiple channels assignable among the multiple nodes.

As is known in the art, the bandwidth allocated to a radio communications system may be divided into channels. Each channel provides for a two-way call between a base station and a mobile station. For example, each channel may comprise a pair of modulated carrier frequencies, one frequency for each direction of communication (mobile-to-base station and base-to-mobile station). Because the number of channels allocated to a radio communications system is finite, it is desirable to increase the capacity of the system by allowing multiple calls to use the same channel. This is called channel reuse.

One way to provide for channel reuse in a radio communications system is to divide a geographic territory covered by the system into multiple areas or "cells." In a cellular communications system, for example, each cell has a base station that communicates with the mobile stations within the territory of the cell. Ideally, calls between a base station and the mobile stations within the base station's cell would not interfere with calls being made within any other cell. In such a case, each channel allocated to the system as a whole could be reused for each one of the cells. That is, two neighboring, non-interfering cells can use the same channel simultaneously. Thus, in the ideal case, the capacity of the system increases in direct proportion to the number of cells in which the system is divided.

In practice, however, interference between neighboring or nearby cells simultaneously using the same channel prevents the ideal case from being realized. The severity of this "co-channel" interference depends on the way in which the allocated bandwidth is divided into channels, the proximity of the cellular base stations, which is generally dictated by the size of the individual cells, and the variability of the local terrain. If co-channel interference is too great, steps must be taken to prevent the simultaneous use of channels by base stations in close proximity to each other.

One commonly used method for providing for some channel reuse in a system with co-channel interference is to pre-assign individual channels among the base stations such that no two base stations within a predetermined distance (called the "reuse distance") of each other may use the same channel. Such systems are said to use a static channel assignment (SCA) scheme because the channel assignment is fixed. When a call request is made, the base station assigns the call to one of the channels pre-assigned to operate in that cell. In analog systems, such as AMPS, the assigning may be performed in the serving base transceiver station (BTS). In digital systems, such as GSM, the assigning may be handled by the base station controller (BSC). One benefit of such schemes is that they may be implemented relatively simply. However, the ease of implementation comes at a cost. The systems cannot easily adapt to changing user demands over time. Once the pre-assigned channels within a cell are in use, further requests for service from the mobile stations (i.e., users) will be delayed or denied; channels assigned to neighboring cells may not be borrowed to accommodate the demand.

More efficient channel assignment schemes than the SCA schemes commonly used have been proposed in the literature. In one type, called a dynamic channel allocation (DCA) scheme, channels are dynamically assigned among the cells from the full complement of available channels to the system as a function of the operating radio environment existing at the time of assignment. The schemes are dynamic in the sense that the channel assignment can adapt to the changing radio environment and the changing demand on the system as a whole. Generally, these schemes assign channels as a function of the measured carrier to interference ratio (C/I). Accordingly, these schemes generally require scanning hardware throughout the system to monitor the radio environment and require a mechanism to gather and process the data received from the scanning hardware.

Another type of scheme is called flexible channel assignment (FCA). FCA allocates a fixed subset of channels among the various cells much like the SCA scheme and reserves a smaller subset of channels for emergency allocation as needed. Allocation of the emergency channels occurs in a scheduled or predictive manner when a cell or a group of cell's fixed subset of channels becomes inadequate.

SUMMARY OF THE INVENTION

In accordance with the invention, a system and method are provided for efficiently assigning a plurality of channels among a plurality of nodes in a radio communications system. For each node in the system, a buffer zone is established. The members of a particular node's buffer zone are that subset of the plurality of nodes in the system that are prohibited from using a channel simultaneously with the particular node. When a particular node is in need of a channel assignment, the system assigns a channel to the particular node from a subset of channels that excludes channels assigned to nodes within the particular channel's buffer zone.

In accordance with one feature of the invention, a node is selected for channel assignment. A subset of a plurality of channels is then determined. The subset of channels excludes channels assigned to nodes associated with the selected node's buffer zone.

In accordance with another feature of the invention, channels are assigned to nodes from the full complement of channels available in the system.

In accordance with another feature of the invention, the buffer zones are determined at a time before any channels are assigned (i.e, prior to normal operation). The need to continuously monitor the radio environment is thereby eliminated.

In accordance with another feature of the invention, the maximum size of any node's buffer zone is selected as a function of the worst-case reuse distance in the system.

In accordance with another feature of the invention, the channel assigned to any particular node is the channel in the subset of available channels which minimizes a predefined cost function.

In accordance with yet another feature of the invention, a co-channel zone is established in addition to the buffer zone.

The co-channel zone comprises the subset of nodes within a predetermined distance of a particular node with the restriction that such subset of nodes is not a member of the nodes in the particular node's buffer zone. When a particular node is in need of a channel assignment, the system assigns the channel that is not assigned within the particular node's buffer zone and that has minimized the cost function associated with the co-channel zone.

In accordance with yet another feature of the invention, a cellular or PCS system is provided. The cellular or PCS system includes a plurality of channels assignable among a plurality of cells. The plurality of cells each have an associated buffer zone, the buffer zones having been determined and stored in the system's memory before the system is placed in operation. During operation, when a cell is in need of a channel, a channel is selected from that subset of channels not already assigned to cells within that particular cell's buffer zone.

In accordance with yet another feature of the invention, a method for use with a radio communications system is provided. With such method, each node has an associated buffer zone. The method includes identifying a one node of a plurality of nodes in the system, selecting a channel from a plurality of channels, checking if the selected channel is assigned to at least one of the plurality of nodes within the selected one node's buffer zone, repeating the selecting and checking if the selected channel is assigned to a node within the one node's buffer zone, and assigning the selected channel if the selected channel is unassigned to every node in the selected one node's buffer zone.

In accordance with yet another feature of the invention, a radio communications system is provided. The system includes a controller for assigning a plurality of channels among a plurality of nodes. The controller includes a memory having stored tables associating each of the plurality of nodes with "buffer zones". The controller correlates the plurality of channels to the plurality of nodes. The controller includes a processor for associating a subset of a plurality of channels with a particular selected node, the subset excluding channels assigned to one or more nodes within a stored subset of nodes correlated to the particular selected node, and that assigns one of the subset of channels to the selected node.

BRIEF DESCRIPTION OF THE DRAWINGS

These and other features of the invention, as well as the invention itself, will become more readily apparent from the following detailed description when taken together with the accompanying drawings, in which:

FIG. 4 shows exemplary tables reflecting buffer zones and channel usage of the system of FIG. 1;

DETAILED DESCRIPTION

Figure 1:
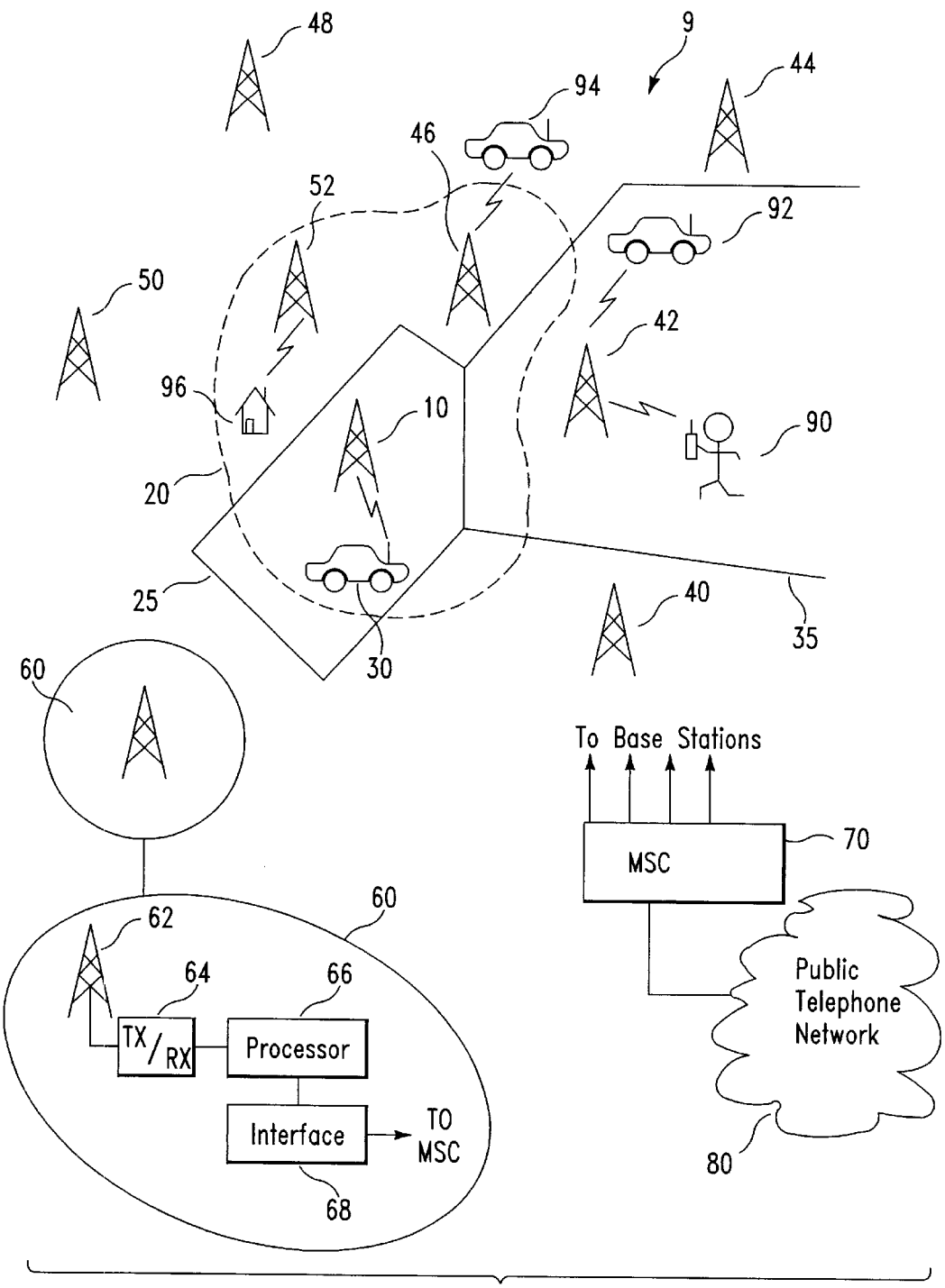
FIG. 1 is the topology for a portion of a mobile radio system according to the invention.

Referring now to FIG. 1, a portion of an exemplary mobile radio network 9 topology is shown. The network of FIG. 1 may be a cellular Network, PCS network, or other radio communications network. FIG. 1 illustrates nine nodes, or base stations, 10, 40, 42, 44, 46, 48, 50, 52, and 60 of the exemplary network 9. Each node, or base station is at a fixed location and is capable of communicating with multiple mobile stations simultaneously. For example, base station 42 is shown handling calls from mobile stations 90 and 92.

The base stations communicate with the mobile stations in a wireless fashion. For example, base station 10 is shown in communication with mobile station 30. The mobile stations include radio transceivers that are compatible with the system 9. They may include transceivers in automobiles, for example, mobile stations 30 and 94; handheld personal communication devices or computers, for example, mobile station 90; or even transceivers permanently attached to an immobile household and business, for example, mobile station 96.

Generally speaking, each base station will communicate with the mobile stations that are within its cell (assigned geographic area) and ignore mobile stations outside its cell. As shown in FIG. 1, for the exemplary system 9, mobile station 30 is within cell 25 for base station 10 and mobile stations 90 and 92 are within cell 35 of base station 42.

Each individual communication, or "call", takes place over a channel. In this exemplary system 9, channels are assigned by a centrally located Mobile Switching Center (MSC) 70. MSC 70 is connected to each base station. For example, MSC 70 may be connected to base station 10 by land line and MSC 70 may be connected to base station 44 by microwave link, or other suitable link. MSC 70 controls the operation of the network 9 and also switches calls between mobile stations and the public telephone network 80.

Alternatively, channels may be assigned in a distributed fashion, either by distributed controllers or even by peer negotiation between base stations. For example, exemplary base station 60 is shown in an exploded view revealing some of its constituent components. Radio signals from a mobile station are received through antenna 62 and are translated into electrical signals by transceiver 64. These signals are then sent to processor 66. Processor 66 decodes the incoming signals. Processor 66 also communicates with MSC 70 via interface 68. In a distributed system, processors 66 in each base station each play a role in collectively assigning channels and communicate with each other via MSC 70. Additionally, MSC 70 could be centrally located in a single computing system, or may be physically distributed throughout the network 9. There may also be intermediate interconnections and switching capabilities between the base stations before reaching MSC 70.

Figure 2:
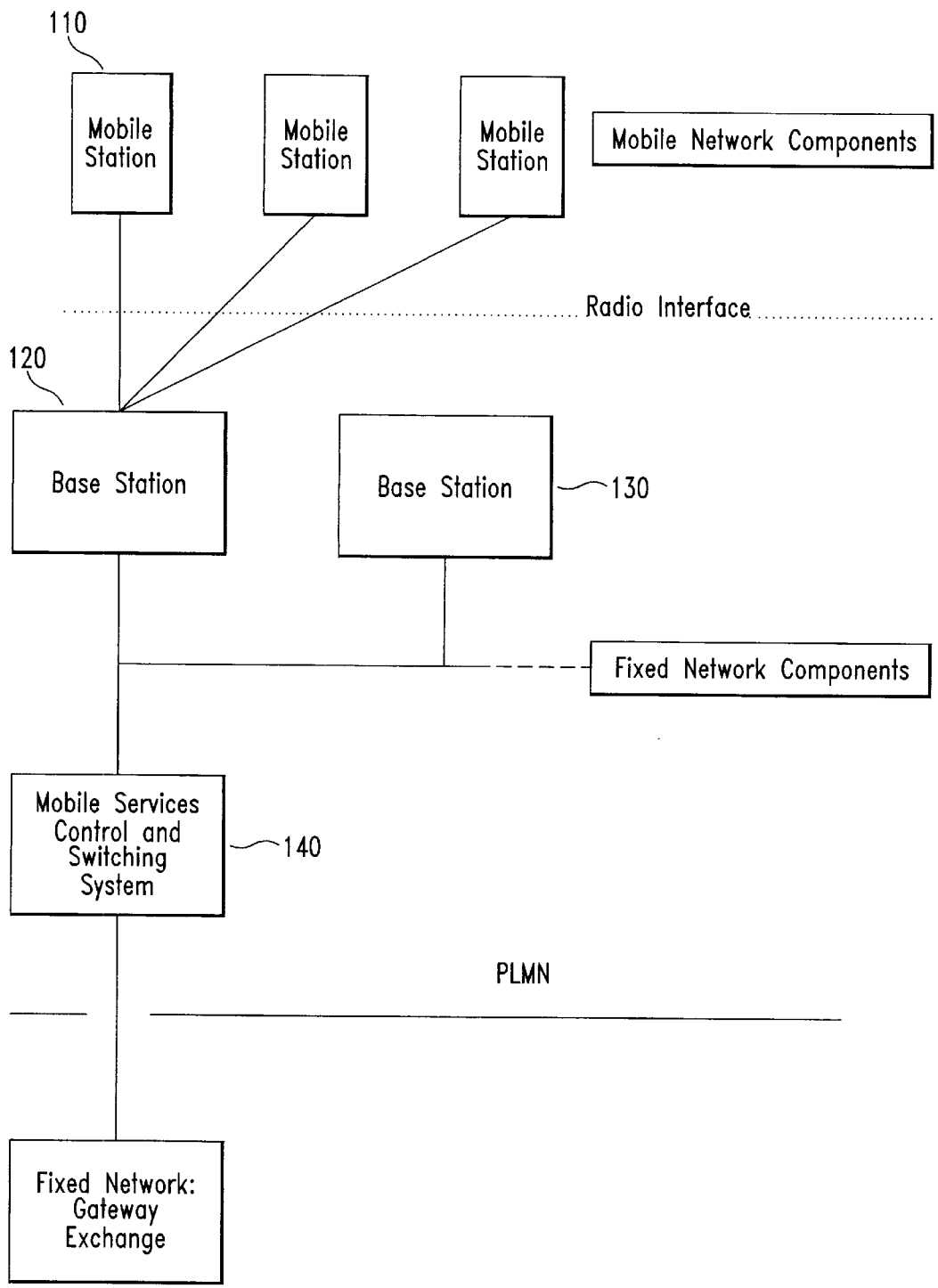
FIG. 2 is a block diagram of a cellular system according to the PRIOR ART.

Referring to FIG. 2, a generic block-level depiction of a cellular network is shown. Mobile stations 110 are shown communicating with base station 120 over a wireless channel. Base station 120 is connected to Mobile Services Control and Switching System (MSCSS) 140. In addition to being connected to the MSCSS 140, base station 120 is also connected to base station 130. Such a configuration as illustrated in FIG. 2 is currently found in the Public Land Mobile Network (PLMN).

Referring again to FIG. 1, the system of the present invention associates a buffer zone 20 with each base station. An individual base station's buffer zone includes the list of surrounding base stations that cannot simultaneously use channels that are in use by the individual base station. For example, buffer zone 20 is associated with base station 10. As can be seen, buffer zone 20 encompasses base station 10 itself and also encompasses base stations 46 and 52. Accordingly, it is impermissible for base station 10 to assign (or be assigned) channels that are in use by either base station 46 or base station 52. Nor, in this example, can base station 10 assign a single channel to more than one call.

Figure 3:
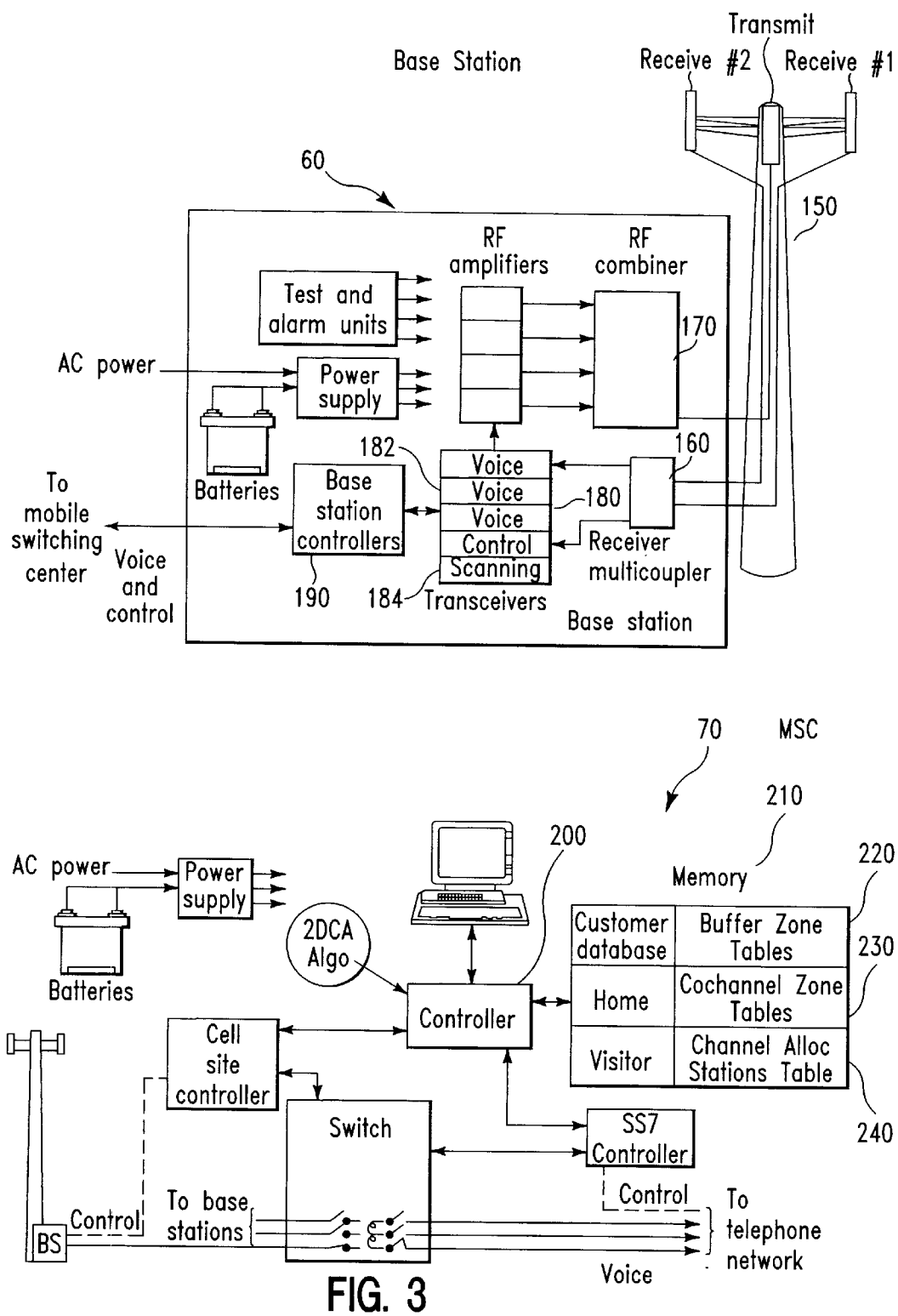
FIG. 3 is a detailed block diagram of the base stations and MSC shown in the radio system of FIG. 1.

Referring to FIG. 3, additional details of exemplary base station 60 and MSC 70 are disclosed. Antenna 150 of base station 60 is connected to transceivers 180 through receiver multi-coupler 160 on the receiver side and RF combiner 170 on the transmitter side. Separate transceivers for voice calls 182 and for scanning and control 184 are shown. The transceivers 180 are connected to the base station controllers 190. The base station controller 190 is also connected to MSC 70.

Also referring to FIG. 3, MSC 70 is shown in more detail. Central to MSC 70 is controller 200. Controller 200 has memory 210. Memory 210 stores the buffer zone tables 220, co-channel zone tables 230, and channel allocation tables 240. Controller 200 assigns channels among the base stations as required. When a base station requires a channel, controller 200 consults the tables of memory 210 and associates a subset of the plurality of channels with a particular base station. The subset of channels, stored in memory 210, excludes channels used within the particular base station's buffer zone.

Referring to FIG. 4, three exemplary tables are shown that are stored in memory 210 at MSC 70. Table A illustrates buffer zone table 220. Table A associates for each particular base station, the corresponding base stations that are within the particular base station's buffer zone. As can be seen in Table A, three base stations are identified as being within the buffer zone of base station 10. These nodes are base stations 46 and 52, and base station 10 itself.

In some systems, it may be assumed that a particular base station's buffer zone includes as a member the particular base station itself. In such a case, it would be unnecessary to indicate explicitly that base station 10, for example, is within base station 10's buffer zone. By making this self-reference implicit, the asterisked (*) entries in Table A may be removed as redundant. The buffer zone associated with base station 40 is shown as including base stations 10, 40, 42, and 60.

Note that base station 40 is within the buffer zone of base station 10, but that base station 10 is not within the buffer zone of base station 40 (i.e., base station 10 is outside of the buffer zone of base station 40). Although buffer zone assignment may be complementary, with each pair of base stations either within each other's buffer zone or excluded from (i.e., outside of) each other's buffer zone, this is not necessarily the case.

The buffer zones are created initially during the design phase and before the radio communications system commences operation. Because the buffer zones do not have to be associated on-the-fly during system operation, the buffer zones associated with each base station may be created in non-real time. Once each node has been associated with a subset of the plurality of nodes forming a buffer zone and these buffer zones have been stored in table 220 in the memory 210, the system may enter the operating mode. Channel assignment among the base stations of the system 9 may then commence.

Table B of FIG. 4 shows an exemplary channel allocation table 240 at a given moment during system operation. As can be seen, channels 2, 3, 5, and 6 are currently assigned in the system. Channel 2 is assigned to base station 42; channel 3 to base station 46; channel 5 to base stations 10, and 44; and channel 6 to base station 42. The table as shown is indexed by channel number.

In some systems it may be advantageous to index the channel assignments by base station instead. Table C illustrates an alternative channel allocation table 240 indexed by base station. As shown, base station 42 has assigned to it channels 2 and 6. Only four base stations are shown active, and only five channels are shown in use. It should be understood that six channels have been selected for simplicity, actual systems would have many more active base stations and channels at any given time. When a base station requires a channel, the buffer zone table is first consulted. For example, if base station 10 required an additional channel, Table A reveals that it cannot be assigned a channel already currently assigned to base station 10 or a channel currently assigned to base stations 46 or 52. By consulting both Table A and Tables B or C, the controller determines for the selected base station, the subset of channels that are assigned within the selected base station's buffer zone. These channels that are assigned within the selected base station's buffer zone are excluded from the subset of channels forming the candidate channel list. Once the candidate channel list is determined, a channel is assigned from the list.

In the channel-indexed system, a channel is chosen according to some channel selection algorithm and Table B is examined. For example, if channel 3 is chosen for possible assignment to base'station 10, the base stations listed in the second column of Table B for channel 3 is compared with the base stations listed in the second column of table A for base station 10. If there is a match, that channel is not available and another channel must be selected.

In the base station-indexed system, Table A is first consulted for the base station requiring a channel, for example base station 10. Then Table C is examined for each base station listed within the buffer zone of base station 10. These channels are then excluded from the list of candidate channels available for assignment to base station 10. A channel is then assigned from the remaining available channels.

In one embodiment, co-channel zones are also created. A co-channel zone for a particular base station includes those nodes that are near the particular base station, but are outside the particular base station's buffer zone. For example, the co-channel zone may consist of those base stations that are adjacent to the outer-most base stations in the buffer zone. The tables for co-channel zones are constructed in the same manner as the buffer zone tables. The use of co-channel zones allows the system to increase channel-reuse efficiency by decreasing the average distance between base stations that are simultaneously sharing channels. The buffer zones and co-channel zones work together to simultaneously maximize channel reuse and minimize co-channel interference.

Figure 5:
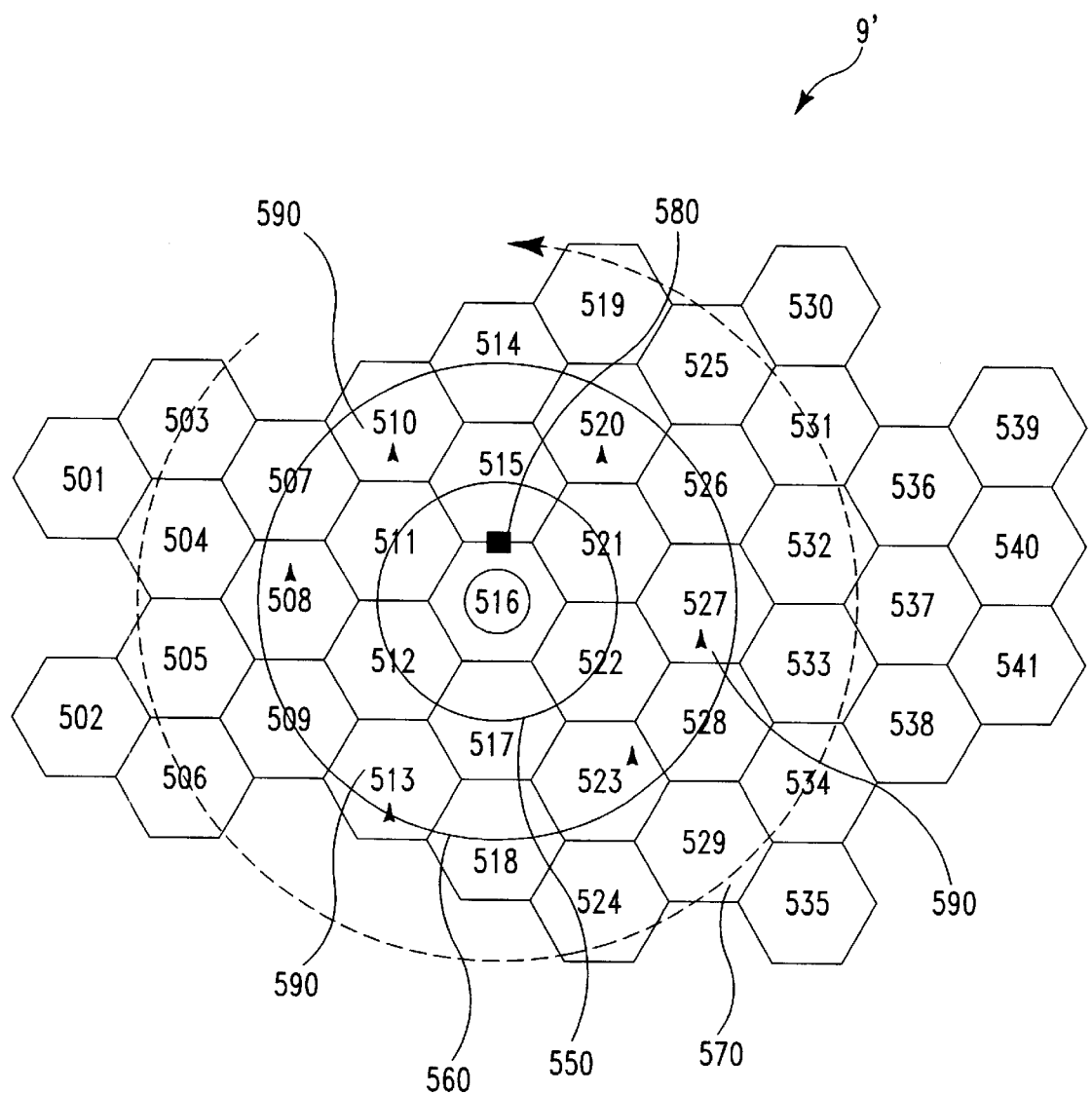
FIG. 5 shows the system of FIG. 1 reconfigured as a schematic topology of a cellular system according to the invention in a hexagonal arrangement and illustrates the worst-case frequency reuse distance at a cell boundary.

Referring to FIG. 5, another exemplary cellular network 9' is shown. For ease of illustration, the individual cells are shown in a hexagonal arrangement. The base stations, numbered 501 to 541, are located at the center of each hexagon. Circle 550 illustrates the frequency reuse cluster of size 7 surrounding base station 516. Reuse cluster 550 would be used by SCA systems to allocate the available frequencies among all the base stations in the system. The illustrated reuse cluster 550 is said to have a depth of one. This is because it includes those cells that are one cell away from base station 516 at the center of the cluster. Circle 560 illustrates the outer boundary of a buffer zone. The buffer zone has a depth of two because it includes all base stations within two cells of center base station 516. Circle 570 illustrates the co-channel zone. In this example, co-channel zone 570 includes all cells touching (i.e., contiguous to) the outer boundary of the buffer zone. It does not include any cells in the buffer zone.

The buffer zones, co-channel zones, and their associated tables are static and are prepared during the initial design of the system based upon worst case interference conditions much in the same way that conventional SCA planning is carried out. The tables may be updated as new base stations are added to the system or if the parameters of operation at the base stations, such as power level, filtering capability, etc., were altered. Unlike SCA schemes, however, channels are not pre-assigned to base stations. Channel assignments change in response to changing traffic patterns. However, there is no need to create buffer zone tables on-the-fly or in "real time", thus dispensing with unnecessary scanning, data gathering, processing, and other overhead required for DCA schemes.

Also, unlike SCA schemes, the systems 9, 9' are initially "over-designed" based on theoretical worst-case interference conditions. For example, one method for producing the buffer zones is to determine a worst case co-channel reuse distance for the system based on the worst case interference conditions. The buffer zone for a particular generalized node (base station, cell, or sector of a cell in a sectorized system, or similar entity) would comprise those nodes that are within the theoretical worst case co-channel reuse distance of the particular node.

Figure 6:
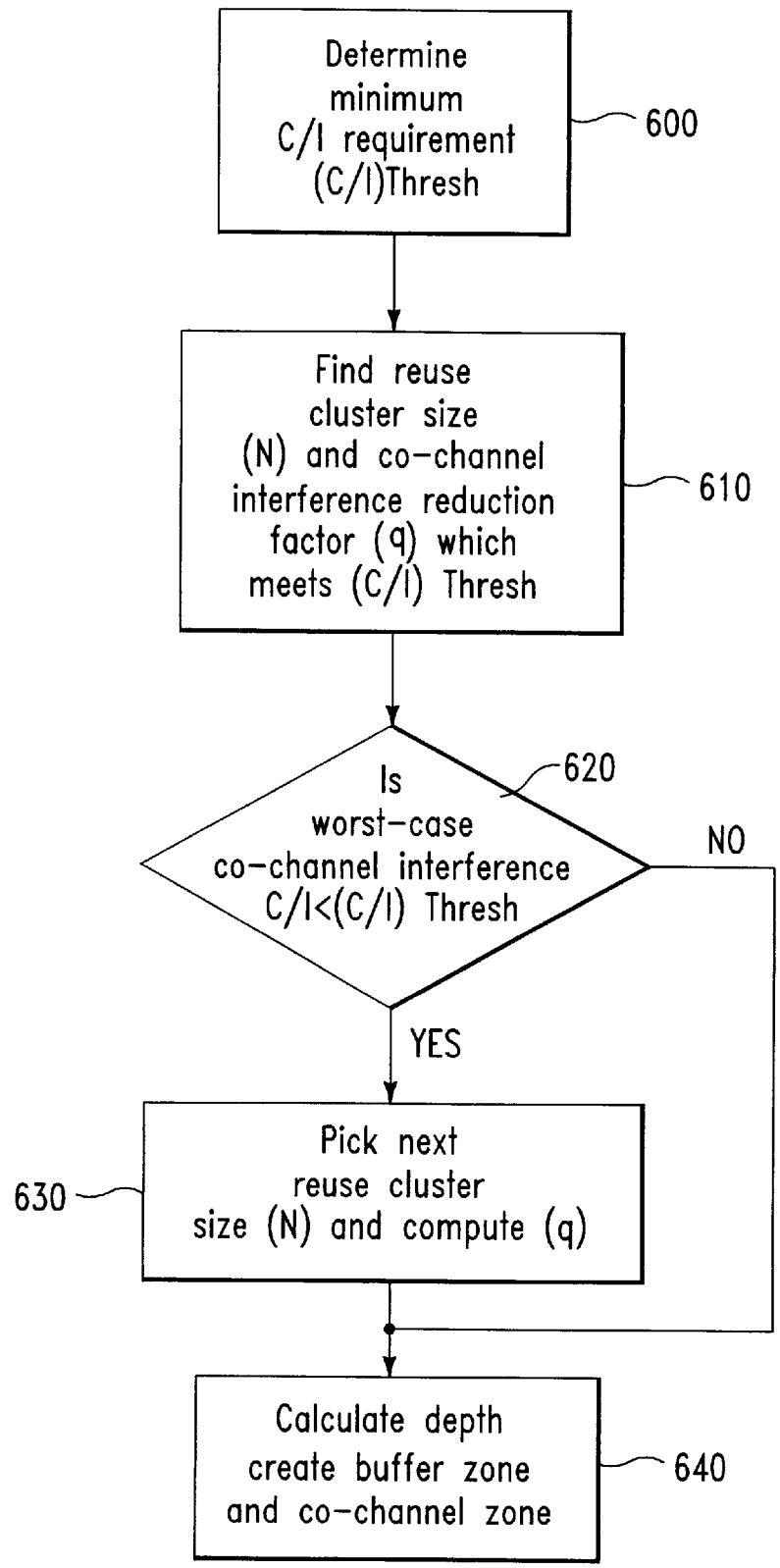
FIG. 6 shows a flow diagram for determining the size of the buffer zone shown for the systems of FIGS. 1 and 5.

FIG. 6 illustrates the method for calculating the worst-case co-channel reuse distance in the buffer-zone system. The first step 600 is to determine the C/I threshold requirements for the system. This is a function of the channel-reuse interference criteria, a design parameter, determined for the system. For example, in the AMPS system, this value is 18 dB; in GSM, the value is 12 dB. The next step 610 is to select a reuse cluster size and determine the co-channel interference reduction factor q.

The co-channel reuse distance D is related to cell radius R and co-channel interference reduction factor q by D=qR. Also, the reuse cluster size, which is the number of cells within the reuse distance, is related to q by N=⌊q²/3⌋ where q is a function of the carrier to interference ratio (C/I). The C/I due to $K_i$ interfering nodes in the first level is evaluated as $$\frac{C}{I} = \frac{C}{\sum_{k=1}^{K_I} I_k}.$$

Assuming that a mobile station is located at roughly the same distance D from each of 6 equally interfering nodes and an inverse-γ power propagation loss (C R$^{-\gamma}$ and $I_k$ $D_k^{-\gamma}$), $$q = \gamma\sqrt{\left(K_I \frac{C}{I}\right)}.$$

With a γ=4 and assuming that a C/I of 18 dB is required for acceptable quality (a valid assumption for analog cellular systems), then a value of q=4.41 is obtained. However, based on simulation studies reported in the literature, q=4.6. Using this more conservative value, a reuse cluster size of N=7 should theoretically meet the quality requirements of the system given the above constraints.

However, a reuse cluster size of N=7 is insufficient even under ideal conditions of flat terrain. This is because the above method does not take into account the worst case scenario when a mobile station is at a cell boundary. At the cell boundary, a mobile station would receive the weakest signal from its own base station, but strong interference from the base stations of neighboring cells.

Referring again to FIG. 5, a mobile station 580 is illustrated at the cell boundary of cell 16 at a distance R from the base station at the center of the cell. If the six base stations 590 are using the same channel as mobile station 580 then the distances between the six interferers 590 and mobile station 580 are two distances of D−R, two distances of D, and two distances of D+R. Hence q is related to C/I by $$\frac{C}{I} = \frac{1}{2(q-1)^{-4} + 2q^{-4} + 2(q+1)^{-4}}$$

where $$\frac{C}{I} = \frac{R^{-4}}{2(D-R)^{-4} + 2D^{-4} + 2(D+R)^{-4}}.$$

Assuming the shortest distance for all six interferers is D−R in the worst case, $$\frac{C}{I} = \frac{1}{6(q-1)^{-4}} \quad \text{where} \quad \frac{C}{I} = \frac{R^{-4}}{6(D-R)^{-4}}.$$

Substituting the q of 4.6 for a reuse cluster size of 7 in the above equation, C/I=14.47.

Returning to FIG. 6, the next step 620 in the method is to compare the calculated C/I to the threshold value. If the calculated value does not exceed the threshold value, the reuse cluster size must be increased. Here, we see that 14.47 is lower than the 18 dB required for an AMPS system, for example. Accordingly, in step 630 the next greater reuse cluster size is selected and a new q is calculated. In some circumstances it may be necessary to repeat step 620 and perform another compare using the new values for N and q.

Even though the calculated C/I in the worst-case boundary condition is less than the threshold value, prior art SCA system design would nonetheless typically use these values anyway. This prior art system would be designed with the reuse cluster size of N=7 and would simply tolerate the interference at the cell boundaries. This is because the inherent inefficiencies of an SCA system does not permit the over-design that may be used with the buffer zones of the invention.

For example, a hypothetical SCA system with a hexagonal arrangement and 21 available channels can only assign three channels per cell with a reuse cluster size of 7. If the reuse cluster size were increased to, for example, 9, then only two channels would be available for assignment to each cell. The trade-off between minimizing co-channel interference and reducing system capacity in this example is severe. In order to avoid this reduction in system capacity, SCA systems typically tolerate some interference at the boundaries of the cells.

The use of buffer zones, however, allows more efficient use of the total available channels in the system and therefore permits the initial over-design of the system to eliminate or significantly reduce interference. In the 21-channel exemplary system above, the use of buffer zones to dynamically allocate channels throughout the system avoids the severe reduction in system capacity found in SCA systems. Even if the buffer zones are designed based on a reuse cluster size of 9, many more than two channels may be assigned to any given cell in the system.

Referring back to FIG. 6, step 630 is reached because the calculated C/I was too low. In reality due to imperfect site locations and the rolling nature of the terrain, the received C/I will often, if not always, be worse than 17 dB, and could be 14 dB or lower. Such an instance could easily occur in a heavy traffic situation. Using a reuse cluster size N=9 in the above equations yields a q=5.2 and a C/I=19.25 dB. Under light traffic conditions, this would be a correct choice for an omnidirectional system. The C/I of 19.25 is greater than 18 and the design continues to step 640.

In step 640, the depth P of the buffer zone is determined.

$$P = \left\lceil \frac{q}{\sqrt{3}} \right\rceil - 1.$$

For a cell j, depth P is the number of cell layers around cell j in order to avoid a potential interference situation. The set of cells forming the buffer zone for cell j is: $F_j(P) = \{f_j^1, f_j^2, \ldots, f_j^Q\}$. Similarly, the co-channel zone of any cell j with a buffer zone of depth P is a set of allowable cells where a channel that is already in use in cell j may be reused without exceeding the worst-case interference threshold in cell j. The set of cells in the co-channel zone is: $A_j(p) = \{a_j^1, a_j^2, \ldots, a_j^R\}$. The co-channel zone has cells that are within a predetermined distance from each particular cell and that are outside the particular cell's buffer zone. Once the buffer and co-channel zones and associated tables are created, the system may commence operation and channels may be assigned on an as-needed basis. Step 640 thus determines which subset of nodes, when paired with each selected node fails to meet the channel-reuse interference criteria established for the system.

Figure 7:
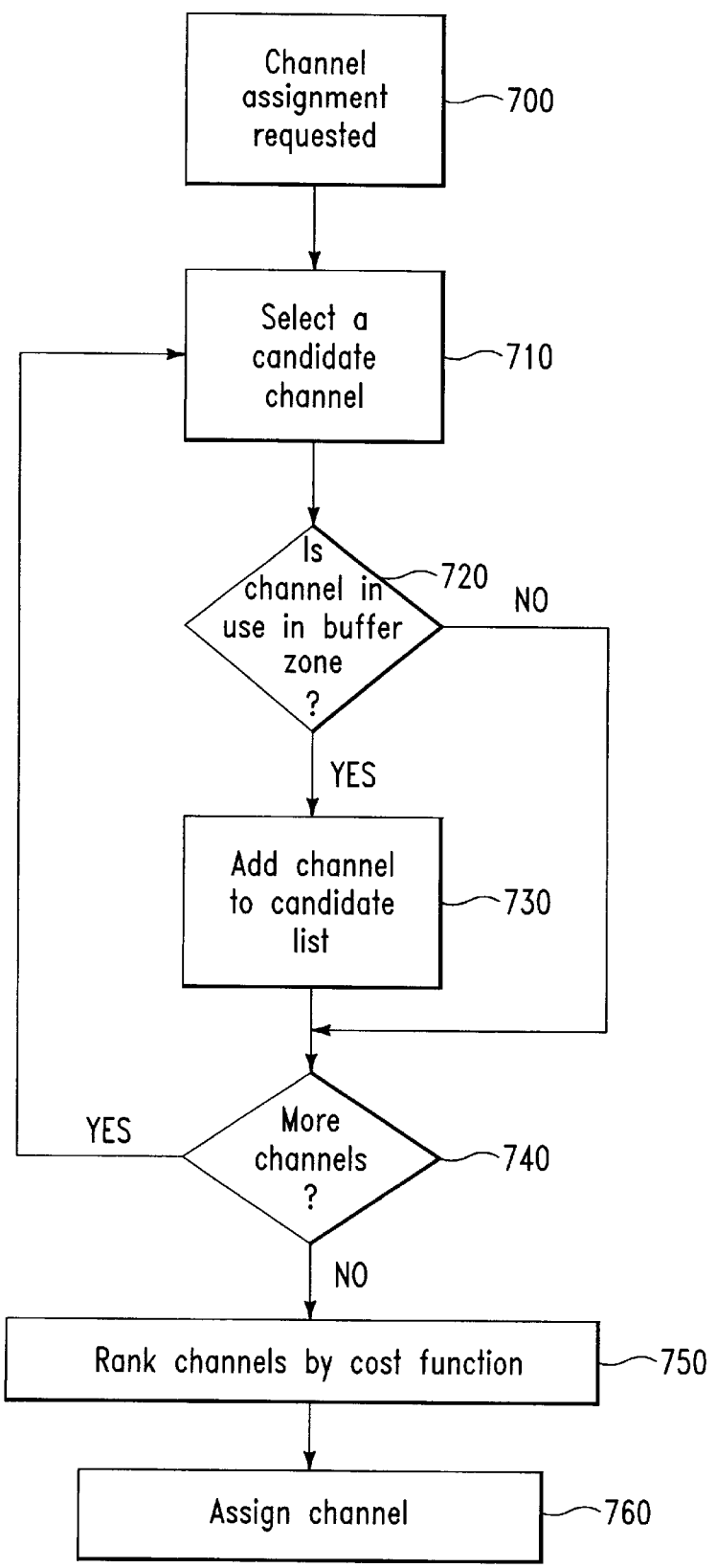
FIG. 7 shows a flow diagram for assigning a channel to a particular node according to the invention.

Referring to FIG. 7, a method for assigning a channel during the operating mode of the system is shown. First, in step 700, a node is selected for communication with a nearby mobile station and a channel assignment is requested. The request may originate from a mobile station desiring to make a call or it may have originated in MSC 70 after being notified that someone desires to call a mobile station. In some circumstances, there may be a desire to pre-assign some number of channels during peak hours to nodes in high-demand. Such a scheduled channel assignment may occur according to some deterministic fashion as a function of, for example, historic traffic patterns.

In response to the request for a channel assignment, a subset of candidate channels is determined. The subset excludes those channels that are assigned to nodes within a particular node's buffer zone. For example, referring to FIGS. 1 and 3, the subset of channels for node 10 would exclude channel three. This subset may be produced by examining each channel sequentially as shown in steps 710–740. For each channel, the channel assignment table is examined and for each candidate channel, the set of nodes that are using the channel is determined. The set of nodes to which the channel is in use is compared with the set of nodes comprising the buffer zone for the node requesting a channel. For each channel, step 720 checks to see whether the selected channel is assigned within the requesting node's buffer zone. If the particular channel is not assigned within the requester's buffer zone, that is, the intersection of the two sets is null, then the channel is added to the candidate channel list.

If the particular channel is assigned within the buffer zone, step 730 is bypassed and the channel number is not added to the list. The selecting step 710 and checking step 720 are repeated until all channels have been examined. Once all channels have been examined, then the selection of each candidate channel is tested against a predetermined cost function in step 750. This step may be performed by sorting the candidate channel list corresponding to the subset of available channels according to the cost function. The channel with the lowest cost, or a channel among those with the lowest cost, is selected for assignment to the requesting node.in step 760.

This method may be simplified if the channels are already ranked in order of their assignment preference, either as a result of a node-independent cost function or otherwise. In this case, the first channel found not to be assigned with in the requesting nodes's buffer zone may be assigned to that node. There would be no need in this circumstance to build a subset of candidate channels. In essence, the candidate channel list would be a subset of one: the first channel found to be a viable candidate. In this circumstance, the "no" branch on decision box 720 would proceed directly to box 760.

There are many different cost functions that may be applied depending on the optimization criteria in the system. Five exemplary cost functions are presented. In the following equations, "i" is the channel identifier, "j" is the cell identifier, "$U_j^{Channel}$" is a set of channels is use in cell j, "$U_i^{cell}$" is the set of cells where channel i is used, and "$C_j$" is an ordered list of 2-tuples for cell j where each tuple represents a candidate channel and its current usage in the system. The rank of the candidate channel is the same as its position in the list. "p(i,j)" is the channel candidacy determination function which evaluates if channel i is a potential candidate for allocation in cell j. Further, "p(i,j)" is given by: . "$F(C_j)$" is the cost function which selects a channel from the candidate channel list $C_j$ based on optimization of factors such as, for example, future blocking probability in the system, usage frequency of the candidate channel. "$cU_j(i)$" is the function which determines usage of channel i in the co-channel zone of cell j. "$AV_j(i)$" is the function which determines systemwide channel availability assuming channel i is already allocated to cell j. "$Avail_m(i,j)$" is the function which determines channel availability in cell m assuming channel i is already allocated to cell j.

The channel assignment procedure may be expressed using the following pseudo-code description:

$C_j \leftarrow \emptyset$
for i=1 to M do
Begin
   if$(i \notin U_j^{channel}) \wedge (\forall k \in F_j(P) \rightarrow i \notin U_k^{channel})$ then
     p(i,j)$\leftarrow$1;
   else
     p(i,j)$\leftarrow$0
   if p(i,j)=1 then
     $C_j \leftarrow C_j \cup \{<i, U_i^{cell}>\}$
   end
   return($F(C_j)$)
end The first cost function, $$f_1(C_j) = \begin{cases} 0; & C_j = \emptyset \\ i_b; & |U_{i_b}^{cell}| = \min\{|U_{i_a}^{cell}| \forall i_a \in C_j\} \wedge (\forall i_c \in C_j | i_c \neq \\ & i_b \wedge |U_{i_c}^{cell}| = |U_{i_b}^{cell}|) \Rightarrow rank(i_b) < rank(i_c) \end{cases}$$

ranks the channels in an order reflecting their usage in the system such that the first channel in the ranking is the channel being used least. Such a cost function would cause the selected channel to have the least amount of interference with other cells in the system and would also be the least interfered with by those calls. This function also minimizes the channel reuse efficiency.

The next cost function, $$f_2(C_j) = \begin{cases} 0; & C_j = \emptyset \\ i_b; & cU_j(i_b) = \min\{cU_j(i_a) | \forall i_a \in C_j\} \wedge (\forall i_c \in C_j | i_c \neq \\ & i_b \wedge cU_j(i_c) = cU_j(i_b)) \Rightarrow rank(i_b) < rank(i_c) \end{cases}$$

where $cU_j()$ is defined as: $cU_j(i) = |U_j^{cell} \cap A_j(P)|$, ranks the channels to minimize channel reuse within the co-channel zone. The co-channel zone may encompass, for example, one layer of nodes beyond the buffer zone. This cost function will minimize co-channel interference, but will not decrease the channel reuse efficiency to the same degree as the prior cost function.

The next cost function, $$f_3(C_j) = \begin{cases} 0; & C_j = \emptyset \\ i_b; & cU_j(i_b) = \max\{cU_j(i_a) | \forall i_a \in C_j\} \wedge (\forall i_c \in C_j | i_c \neq \\ & i_b \wedge cU_j(i_c) = cU_j(i_b)) \Rightarrow rank(i_b) < rank(i_c) \end{cases}$$

where $cU_j()$ is defined as: $cU_j(i) = |U_j^{cell} \cap A_j(P)|$, ranks the channels to maximize channel reuse within the co-channel zone. This cost function has the benefit of increasing channel reuse efficiency and thus offer potentially increased performance over the first two cost functions.

The next cost function, $$f_4(C_j) = \begin{cases} 0; & C_j = \emptyset \\ i_b; & AV_j(i_b) = \max\{AV_j(i_a) | \forall i_a \in C_j\} \wedge (\forall i_c \in C_j | i_c \neq \\ & i_b \wedge AV_j(i_c) = AV_j(i_b)) \Rightarrow rank(i_b) < rank(i_c) \end{cases}$$

where $$AV_j(i) = \sum_{m=1}^{k} Avail_m(i, j)$$

and $Avail_m(i,j)$ is defined as:

$$Avail_m(i, j) = \begin{cases} |C_m| - 1; & m = j \\ |C_m|; & m \neq j, \end{cases}$$

ranks the channels to minimize system wide blocking probability (i.e. maximize system wide channel availability). This cost function maximizes channel reuse efficiency and accordingly can offer increased performance under heavy traffic conditions.

Finally, a simple cost function may be implemented that chooses the first channel available from the candidate channel list. This cost function is shown by:

$$f_5(C_j) = \begin{cases} 0; & C_j = \emptyset \\ i_b; & rank(i_b) - \min\{rank(i_a) | \forall i_a \in C_j\}. \end{cases}$$

Once a channel assignment is no longer needed, the channel assignment is released and the channel assignment table is updated. Channels may be released either at the termination of a call, at a predetermined time after the termination of a call, according to some system wide deterministic function, or other criteria depending on the system requirements.

Other embodiments are within the spirit and scope of the appended claims.

What is claimed is:

1. In a radio communications system having a plurality of nodes and a plurality of channels, a method for assigning one of the plurality of channels to a selected one of the plurality of nodes, such method comprising:

associating with each one of the plurality of nodes a subset of the plurality of nodes, such subset providing a "buffer zone" associated with such one of the plurality of nodes, such subset of the plurality of nodes being stored in a database;

determining, on a real-time basis for the selected one of the plurality of nodes, a subset of the plurality of channels, the subset of channels excluding channels assigned to the nodes in the "buffer zone" associated with such selected one of the nodes, such determining comprising accessing the database; and assigning one of the channels from the subset of channels to the selected one of the nodes.

2. The method of claim 1 wherein the associating is performed at a time prior to any channel assignment.

3. The method of claim 2 wherein the associating is performed in non-real time.

4. The method of claim 1 wherein the assigning further comprises:

sorting the subset of channels according to a predetermined cost function, and selecting from the sorted subset of channels a one channel for the assigning that minimizes the cost function.

5. The method of claim 4 wherein the assigning assigns a one of the subset of channels that minimizes system-wide probability of blocking.

6. The method of claim 4 wherein the assigning assigns a one of the subset of channels that maximizes system-wide channel availability.

7. The method of claim 1 further comprising:

determining a co-channel zone surrounding the selected one node, said co-channel zone comprising a subset of nodes that are within a predetermined distance of the selected one node and that are not within the selected one node's buffer zone; and wherein the assigning assigns a one of the subset of channels as a function of channel usage in the co-channel zone.

8. The method of claim 7 wherein the assigning minimizes co-channel interference within the co-channel zone.

9. The method of claim 7 wherein the assigning maximizes channel reuse within the co-channel zone.

10. In a radio communications system having a plurality of nodes and a plurality of channels, a method for assigning one of the plurality of channels to a selected one of the plurality of nodes, such method comprising:

associating with each one of the plurality of nodes a subset of the plurality of nodes, such subset providing a "buffer zone" associated with such one of the plurality of nodes;

determining, on a real-time basis for the selected one of the plurality of nodes, a subset of the plurality of channels, the subset of channels excluding channels assigned to the nodes in the "buffer zone" associated with such selected one of the nodes; and assigning one of the channels from the subset of channels to the selected one of the nodes;

wherein the associating is performed at a time prior to any channel assignment;

wherein the associating is performed in non-real time;

wherein the assigning further comprises:

sorting the subset of channels according to a predetermined cost function, and selecting from the sorted subset of channels a one channel for the assigning that minimizes the cost function;

wherein the assigning assigns a one of the subset of channels that is used least in the system.

11. In a cellular or PCS radio telecommunications system having of a plurality of cells and a plurality of channels assignable among the plurality of cells, a method of assigning the channels, such method comprising:

(a) prior to entering an operating mode,
 (i) determining a channel-reuse interference criteria for the system,
 (ii) determining for each one of the plurality of cells a subset of the plurality of cells failing to meet the channel-reuse interference criteria when paired with such one of the cells, such subset providing a buffer zone, such subset of the plurality of cells being stored in a database, and (b) during the operating mode,
 (i) selecting one of the cells requiring a channel assignment,
 (ii) determining a subset of channels of the plurality of channels on a real-time basis, such subset having members other than channels assigned to cells in the buffer zone for the selected one of the cells, such determining comprising accessing the database,
 (iii) assigning one of the subset.of channels to the selected one of the cells.

12. The method of claim 11 further comprising:

(a) prior to entering the operating mode:
 for each cell of the plurality of cells, determining a "co-channel zone" comprising cells that are within a predetermined distance from said each cell and that are outside said each cell's buffer zone, and (b) during the operating mode,
 selecting a one of the subset of channels for assignment as a function of channel usage within the co-channel zone.

13. The method of claim 11 wherein the channel reuse interference criteria is selected as a function of the worst-case reuse distance in the system.

14. The method of claim 11 wherein the radio communications system is digital.

15. The method of claim 11 wherein the radio communications system is analog.

16. In a radio communications system having a plurality of nodes and a plurality of channels and having a portion of the plurality of channels assigned to a portion of the plurality of nodes, a method for assigning one of the plurality of channels to a selected one of the plurality of nodes, such method comprising:

associating for each node of the plurality of nodes a subset of the plurality of nodes forming a "buffer zone" for said each node, such subset of the plurality of nodes being stored in a database, selecting a channel from the plurality of channels, checking the database to determine if the selected channel is assigned to at least one of the plurality of nodes within the selected one node's "buffer zone", repeating the selecting and checking if the selected channel is assigned to at least one of the plurality of nodes within the selected one node's "buffer zone", assigning on a real-time basis the selected channel to the selected one node if the selected channel is unassigned to every node of the selected one node's "buffer zone".

17. The method of claim 16 wherein the associating step is performed prior to any channel assignment.

18. A radio communications system comprising:

a plurality of nodes, each of the plurality of nodes comprising a radio transceiver for communicating with stations over a plurality of channels, the plurality of channels being assignable among the plurality of nodes, a controller for assigning the plurality of channels among the-plurality of nodes, the controller, the controller comprising:
- a memory having stored therein: data correlating for each node of the plurality of nodes a subset of nodes of the plurality of nodes; data correlating the plurality of channels to the plurality of nodes to which the plurality of channels may be assigned;
- a controller for associating a subset of the plurality of channels with a particular selected node, the subset excluding channels assigned to one or more nodes within the stored subset of nodes correlated to the particular selected node, and for assigning on a real-time basis one of the associated subset of channels to the particular selected node, and
- wherein the memory has stored therein the associated subset of channels.

19. The mobile radio communications system of claim 18 wherein the controller is disposed centralized in a single location.

20. The mobile radio communications system of claim 18 wherein the controller is distributed among multiple locations.

21. The mobile radio communications system of claim 18 wherein the controller assigns the one channel of the determined subset of channels so as to minimize a predetermined cost function.

22. A radio communications system comprising:
- a plurality of nodes, each of the plurality of nodes comprising a radio transceiver for communicating with mobile stations over a plurality of channels, the plurality of channels being assignable among the plurality of nodes,
- a controller for assigning the plurality of channels among the plurality of nodes, the controller, the controller comprising:
  - a first memory having stored therein data correlating for each node of the plurality of nodes a subset of nodes of the plurality of nodes,
  - a second memory having stored therein data correlating the plurality of channels to the plurality of nodes to which the plurality of channels may be assigned,
  - a controller for associating in real-time a subset of the plurality of channels with a particular selected node, the subset excluding channels assigned to one or more nodes within the stored subset of nodes correlated to the particular selected node, and for assigning one of the associated subset of channels to the particular selected node, and
  - a third memory having stored therein the associated subset of channels.

23. The mobile radio communications system of claim 22 wherein the controller is disposed centralized in a single location.

24. The mobile radio communications system of claim 22 wherein the controller is distributed among multiple locations.

25. The mobile radio communications system of claim 22 wherein the controller assigns the one channel of the determined subset of channels so as to minimize a predetermined cost function.

26. In a radio communications system having a plurality of nodes and a plurality of channels, a method for assigning one of the plurality of channels to a selected one of the plurality of nodes, such method comprising:
- establishing a database associating each one of the plurality of nodes with a subset of the plurality of nodes, such subset providing a "buffer zone" associated with such one of the plurality of nodes;
- accessing the established database to determine, on a real-time basis for the selected one of the plurality of nodes, a subset of the plurality of channels, the subset of channels excluding channels to the nodes in the "buffer zone" associated with such selected one of the nodes; and
- assigning one of the channels from the subset of channels to the selected one of the nodes.

27. The method of claim 26 wherein the establishing of the database is performed at a time prior to any channel assignment.

28. The method of claim 27 wherein the accessing is performed in non-real time.

29. The method of claim 26 wherein the assigning further comprises:
- sorting the subset of channels according to a predetermined cost function, and
- selecting from the sorted subset of channels a one channel for the assigning that minimizes the cost function.

30. The method of claim 29 wherein the assigning assigns a one of the subset of channels that minimizes system-wide probability of blocking.

31. The method of claim 29 wherein the assigning assigns a one of the subset of channels that maximizes system-wide channel availability.

32. In a radio communications system having a plurality of nodes and a plurality of channels, a method for assigning one of the plurality of channels to a selected one of the plurality of nodes, such method comprising:
- establishing a database associating each one of the plurality of nodes with a subset of the plurality of nodes, such subset providing a "buffer zone" associated with such one of the plurality of nodes;
- accessing the database to determine, for the selected one of the plurality of nodes, a subset of the plurality of channels, the subset of channels excluding channels assigned to the nodes in the "buffer zone" associated with such selected one of the nodes; and
- assigning one of the channels from the subset of channels to the selected one of the nodes;
- wherein the accessing of the database is performed at a time prior to any channel assignment;
- wherein the accessing the database is performed in non-real time;
- wherein the assigning further comprises:
  - sorting the subset of channels according to a predetermined cost function, and
  - selecting from the sorted subset of channels a one channel for the assigning that minimizes the cost function;
- wherein the assigning assigns a one of the subset of channels that is used least in the system.

33. The method of claim 26 further comprising:
- determining a co-channel zone surrounding the selected one node, said co-channel zone comprising a subset of nodes that are within a predetermined distance of the selected one node and that are not within the selected one node's buffer zone; and wherein the assigning assigns a one of the subset of channels as a function of channel usage in the co-channel zone.

34. The method of claim 33 wherein the assigning minimizes co-channel interference within the co-channel zone.

35. The method of claim 33 wherein the assigning maximizes channel reuse within the co-channel zone.

36. In a cellular or PCS radio telecommunications system having of a plurality of cells and a plurality of channels assignable among the plurality of cells, a method of assigning the channels, such method comprising:

(a) prior to entering an operating mode,
  (i) determining a channel-reuse interference criteria for the system,
  (ii) establishing a database which establishes for each one of the plurality of cells a subset of the plurality of cells failing to meet the channel-reuse interference criteria when paired with such one of the cells, such subset providing a buffer zone,
and
(b) during the operating mode,
  (i) selecting one of the cells requiring a channel assignment,
  (ii) accessing the database to determine a subset of channels of the plurality of channels on a real-time basis, such subset having members other than channels assigned to cells in the buffer zone for the selected one of the cells,
  (iii) assigning one of the subset of channels to the selected one of the cells.

37. The method of claim 36 further comprising:

(a) prior to entering the operating mode:
  for each cell of the plurality of cells, determining a "co-channel zone" comprising cells that are within a predetermined distance from said each cell and that are outside said each cell's buffer zone, and (b) during the operating mode,
  selecting a one of the subset of channels for assignment as a function of channel usage within the co-channel zone.

38. The method of claim 36 wherein the channel reuse interference criteria is selected as a function of the worst-case reuse distance in the system.

39. The method of claim 36 wherein the radio communications system is digital.

40. The method of claim 36 wherein the radio communications system is analog.

41. In a radio communications system having a plurality of nodes and a plurality of channels and having a portion of the plurality of channels assigned to a portion of the plurality of nodes, a method for assigning one of the plurality of channels to a selected one of the plurality of nodes, such method comprising:

establishing a database which associates for each node of the plurality of nodes a subset of the plurality of nodes forming a "buffer zone" for said each node, selecting a channel from the plurality of channels, checking the database to determine if the selected channel is assigned to at least one of the plurality of nodes within the selected one node's "buffer zone", repeating the selecting and checking if the selected channel is assigned to at least one of the plurality of nodes within the selected one node's "buffer zone", assigning on a real-time basis the selected channel to the selected one node if the selected channel is unassigned to every node of the selected one node's "buffer zone".

42. The method of claim 41 wherein the establishing of the database step is performed prior to any channel assignment.

* * * * *